E. L. PETERSON.
ATTACHMENT TO LISTER CULTIVATORS.
APPLICATION FILED OCT. 1, 1915.
1,202,579.
Patented Oct. 24, 1916.
2 SHEETS—SHEET 1.
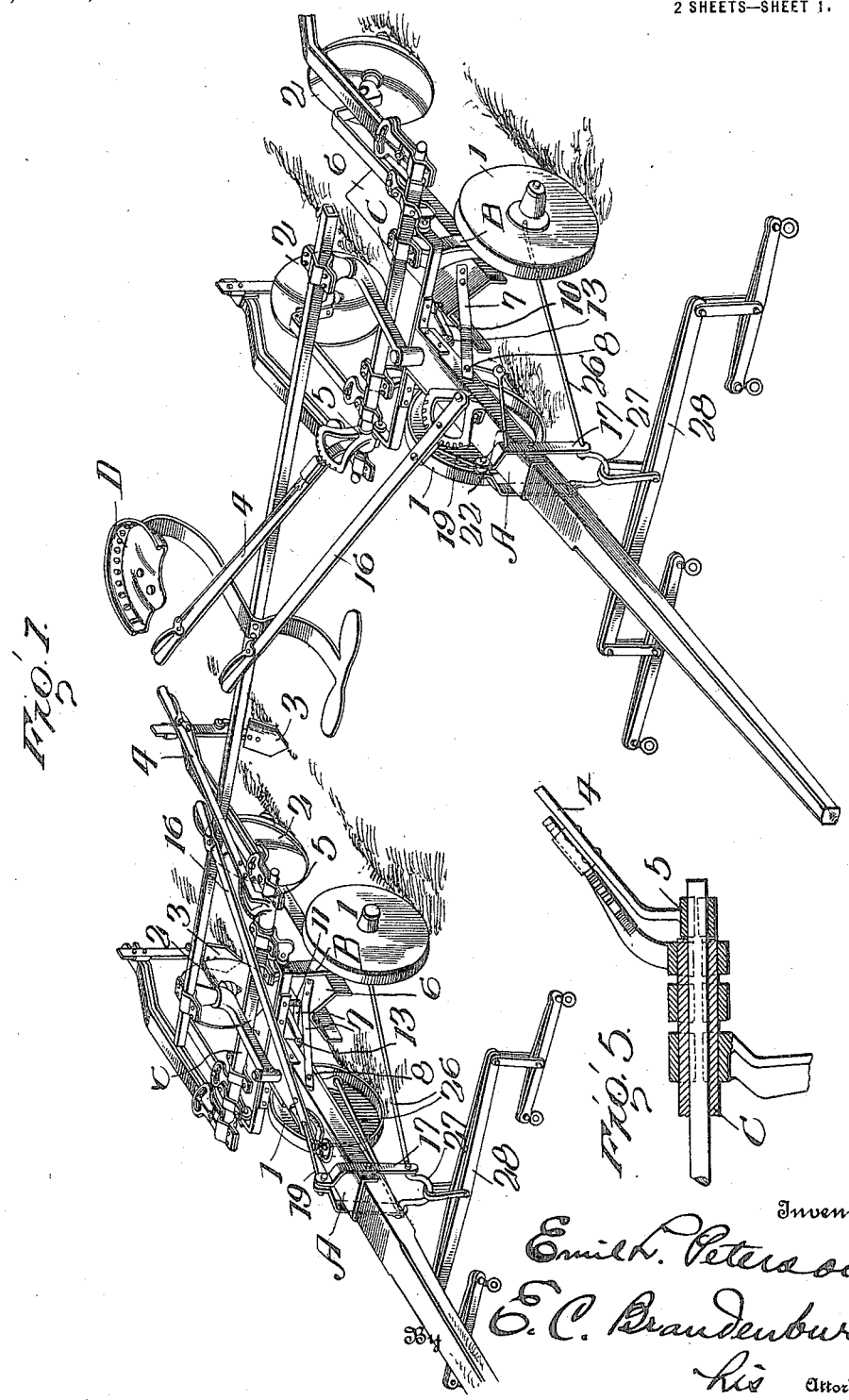

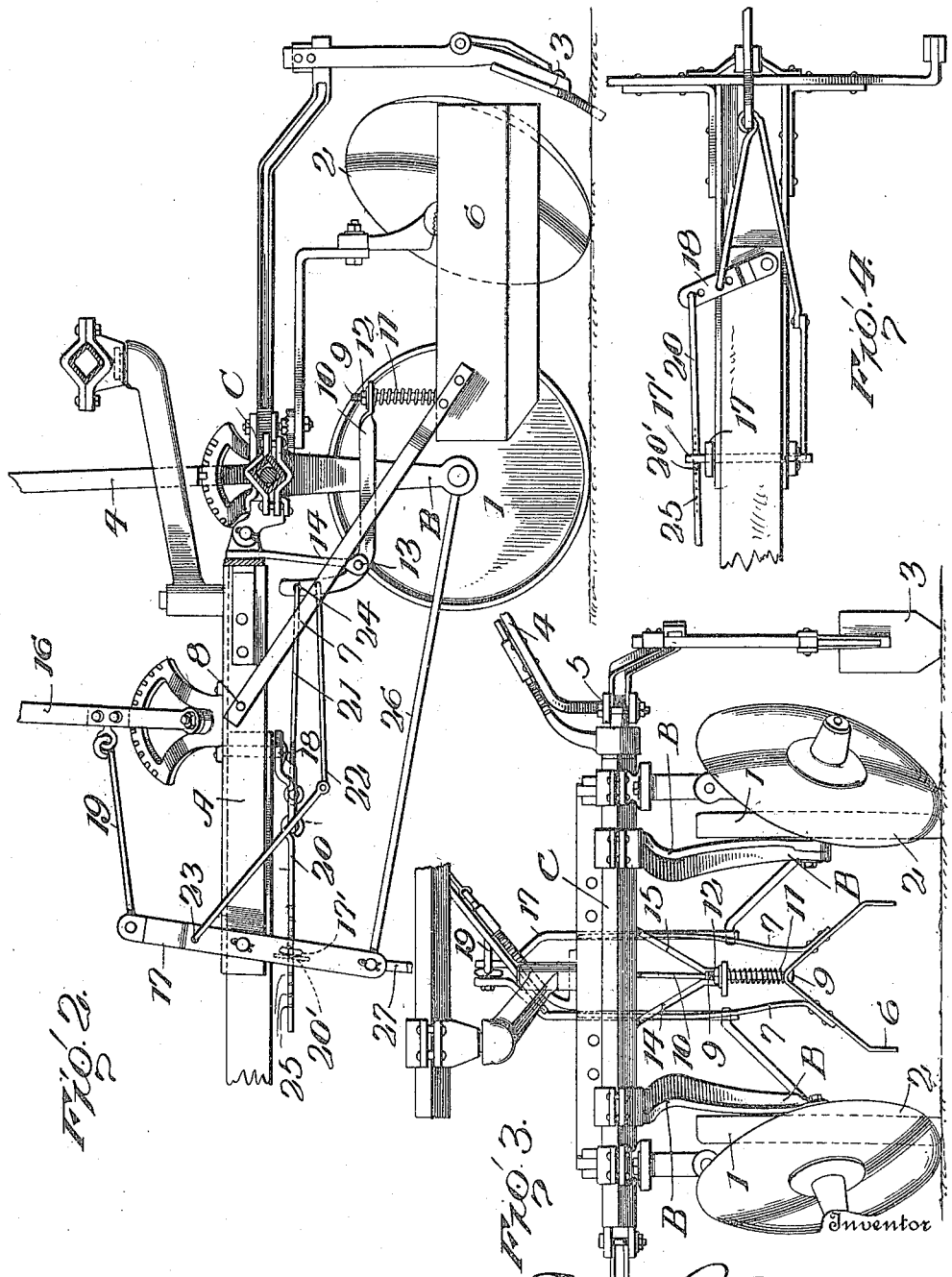

UNITED STATES PATENT OFFICE.

EMIL L. PETERSON, OF BERTRAND, NEBRASKA.

ATTACHMENT TO LISTER-CULTIVATORS.

1,202,579.  Specification of Letters Patent.  Patented Oct. 24, 1916.

Application filed October 1, 1915.  Serial No. 53,519.

*To all whom it may concern:*

Be it known that I, EMIL L. PETERSON, a citizen of the United States, residing at Bertrand, in the county of Phelps and State of Nebraska, have invented certain new and useful Improvements in Attachments to Lister-Cultivators, of which the following is a specification.

My invention relates to an improvement in attachments to lister cultivators, and this attachment is particularly adapted for the John Deere lister cultivator, the object being to raise the fender as the machine goes deeper into the ground.

When the machine comes to a weedy place in the field, and the disks and shovels are lowered a notch deeper in order to better remove the weeds, my improved attachment will raise the fenders, as much or as little as the driver desires, allowing the mulsh to cover the weeds in the row. Ordinarily the fenders are lowered every time the disks and shovels are lowered, thereby preventing the mulsh from covering the weeds in the row, but by the use of my improvement, this objection is obviated. By the use of my invention, there is another advantage, namely that in coming to small corn, when the disks and shovels are raised one notch with the lever, it lowers the fender, and thereby prevents the corn from being covered. Also in taking the machine out of the ground when turning, the fender may be raised to prevent it from breaking or bending. The entire attachment is controlled automatically by the use of the same lever that is used in operating the machine.

In the accompanying drawings: Figure 1 is a perspective view of a cultivator with my improvement attached, Fig. 2 is a view in side elevation, Fig. 3 is a rear view, and Fig. 4 is a detail of the bottom of the cultivator frame.

A is the frame and 1—1 are the wheels upon which the frame is supported by means of axle supports B—B to a cross bar C.

The numerals 2—2 are disks and 3—3 are shovels of the ordinary type, and a lever 4 is pivoted at 5 on the rear end of the main frame A, and is controlled by the driver from the seat D, for adjusting the shovels 3—3 to a depth corresponding to that of the disks, 2—2.

The numeral 6 represents the fender which is secured to the rear end of brace rod 7 pivoted at 8 to a frame A. The fender is adapted to straddle a plant as shown in Fig. 3 and protect it as the earth is shoveled up by the disks or shovels. The fender 6 is connected through bolt 9 to the rear end of the bell crank lever 10 and is held yieldingly in position by means of the spring 11, and nut 12. The bell crank lever 10 is pivoted at 13 which is the intersection of brace rods 14 and 15, said rods being mounted upon and depending from frame A.

A system of levers comprising a hand lever 16, a rocking lever 17, and a transversely pivoted lever 18 are all pivotally connected to the main frame A, and connected to one another by links 19 and 20. Link 20, being provided at one end with perforations 25 and a key 20' adapted to engage an eye-bolt 17' or like device on the lever 17. At the intersection of the lever 17 with rod 26 a clevis 27 is provided to which is connected a double-tree 28. These levers are employed to rock the bell crank lever 10, the connecting rod 21 extending from the transversely pivoted lever 18 to the bell crank lever 10, so by pulling back on the hand lever 16 the fender is raised out of the ground and by reversing the lever it is lowered into position. A jointed rod 22 extends from point 23 on the lever 17 to 24 on the bell crank lever 10.

As a means of regulating the extent of movement of the several parts, the link 20 is provided with perforations 25 to permit of adjustment. To the lower end of lever 17 is pivotally connected a rod 26, which is connected at its opposite end to axle supports B—B which are rigidly connected to the cross bar C. When the machine is set so that the lever 17 is perpendicular, the fender is lowered by pushing the hand lever 16 forward 1, 2 or 3 notches. At the same time the disks and shovels are raised, but pushing the lever 16 to its full extent tightens the jointed rod 22 and pulls the bell crank lever 10 forward, and raises the rear end of the bell crank lever 10, thus raising the fender to its full extent. It will be apparent that the link 20 slides easily through the eye-bolt 17' and thus does not affect the lever 17. When lever 16 is pulled back from its full extent it releases the pivoted rod 22 allowing it to bend at the joint. It also causes lever 17 to oscillate about its pivot causing the link 20 to return through the eye-bolt 17' until it is engaged by the key 20'. Then the lever 18 and bell crank lever 10 may be moved for operating the fender as before. The hand lever 16 also controls the operation of shovels and disks by means of lever 17, which is connected by rod 26 to the axle support B secured to the cross bar C, and as the wheels are moved backward and forward by oscillation about the cross bar C, the shovels and disks are raised or lowered. Thus it will be seen that by a very simple arrangement, I have produced a machine which operates the wheels and disks or shovels as the driver desires, at the same time and by the same levers and same motion provides for the movement of the fender so that the fender may be raised when the disks are sunk and vice versa.

It is obvious that when coming to the end of the field the lever 16 is pushed forward to its limit and pushes back the wheels by means of rods 26 which raise the disks 2—2 through the cross bar C, and at the same time raise the fender 6 by means of the jointed rod 22.

I claim:

1. The combination with a main frame, of wheels, cultivating means, a fender, a bell crank lever adapted to raise and lower said fender, a rocking lever pivoted to the frame, a plurality of means connecting the rocking lever with the bell crank lever, means for actuating the said rocking lever, whereby upon the movement of the rocking lever in one direction, the bell crank lever will be actuated through one connecting means so as to raise the fender, and upon the actuation of the rocking lever in the other direction, said bell crank lever will be actuated through another connecting means so as to raise the fender.

2. The combination with a cultivator frame, cultivating means mounted thereon, independently operable means for varying the distance of the frame and cultivating means above the ground, a fender mounted on the frame and automatically operable means for varying the distance of the frame and fender above the ground in inverse relation to each other.

3. The combination of a main frame, wheels, means for cultivating the ground, a fender located between said means and adapted to straddle the plants being cultivated, a fender-lever, means for connecting the fender-lever with the fender, a brace extending from the fender to the main frame, a hand-lever, a rock-lever, a depending lever, links pivotally connecting all of said levers together, and a jointed rod extending from the fender-lever to the rock-lever.

4. The combination with a main frame, of levers pivotally mounted thereon, a bell crank lever pivotally supported on said frame, a fender supported by said bell crank lever, means connecting one of the levers with said bell crank lever, whereby the movement of the lever first lowers the fender, and continued movement in the same direction raises the fender.

In testimony whereof I affix my signature.

EMIL L. PETERSON.

Witness:
Roscoe J. Slater.

Copies of this patent may be obtained for five cents each, by addressing the "Commissioner of Patents, Washington, D. C."